United States Patent
Van Dijk

(10) Patent No.: US 6,639,046 B1
(45) Date of Patent: Oct. 28, 2003

(54) COMPOSITION COMPRISING MERCAPTO-FUNCTIONAL COMPOUNDS

(75) Inventor: Joseph Theodorus Maria Van Dijk, Leiden (NL)

(73) Assignee: Akzo Nobel N.V., Arnhem (NL)

(*) Notice: Subject to any disclaimer, the term of this patent is extended or adjusted under 35 U.S.C. 154(b) by 0 days.

(21) Appl. No.: 09/980,447

(22) PCT Filed: Apr. 19, 2000

(86) PCT No.: PCT/EP00/03746

§ 371 (c)(1),
(2), (4) Date: Feb. 5, 2002

(87) PCT Pub. No.: WO00/64959

PCT Pub. Date: Nov. 2, 2000

(30) Foreign Application Priority Data

Apr. 26, 1999 (EP) ............................................. 99201294

(51) Int. Cl.[7] .............................................. C08G 63/68
(52) U.S. Cl. ...................... 528/293; 528/271; 528/274; 528/303; 528/306; 528/376; 528/390; 528/419; 528/422; 428/500
(58) Field of Search ................................. 528/271, 274, 528/293, 303, 306, 376, 390, 419, 422; 428/500

(56) References Cited

U.S. PATENT DOCUMENTS

| 2,759,913 A | 8/1956 | Hulse ....................... 260/89.7 |
|---|---|---|
| 4,283,480 A | 8/1981 | Davies et al. ................. 430/270 |
| 4,730,033 A | 3/1988 | Horley et al. ................. 528/288 |
| 5,840,823 A | 11/1998 | Licht et al. .................... 528/73 |

FOREIGN PATENT DOCUMENTS

| EP | 0 160 284 B1 | 10/1985 | ......... C07D/498/16 |
|---|---|---|---|
| EP | 0 284 374 A2 | 9/1988 | ......... C07C/149/20 |
| EP | 0 448 224 B2 | 9/1991 | ............. C08F/2/38 |
| GB | 2 166 749 A | 5/1986 | ........... C08G/63/76 |
| WO | WO 93/17060 | 9/1993 | ........... C08G/63/02 |
| WO | WO 98/41316 | 9/1998 | ........... B01F/15/04 |
| WO | WO 98/41561 | 9/1998 | ........... C08G/63/91 |

OTHER PUBLICATIONS

European Search Report dated: Sep. 30, 1999 for Application No.: EP 99 20 1294.

Advanced Organic Chemistry– J. Mar. 4th Edition (1992) p. 1298.

J. Org. Chem. 1990, vol. 55, pp. 5919–5922.

*Primary Examiner*—Samuel A. Acquah
(74) *Attorney, Agent, or Firm*—Joan M. McGillycuddy

(57) ABSTRACT

The present invention relates to a composition comprising: a compound comprising two or more olefinically unsaturated groups comprising at least on electron-withdrawing functionality linked to a carbon atom of the unsaturated bond; a compound comprising at least two mercapto-functional groups; and a catalyst comprising at least one, optionally blocked, NH-group. The invention further relates to a method for the application of the composition and to the use of the composition as a coating composition or an adhesive.

8 Claims, No Drawings

COMPOSITION COMPRISING MERCAPTO-FUNCTIONAL COMPOUNDS

This application is the national phase of International Patent Application No. PCT/EP00/03746, filed on Apr. 19, 2000 and which claims priority of European Patent Application No. 99201294.8, filed Apr. 26, 1999.

FIELD OF THE INVENTION

The present invention relates to a composition comprising:
 a compound comprising two or more olefinically unsaturated groups comprising at least one electron-withdrawing functionality linked to a carbon atom of the unsaturated bond;
 a compound comprising at least two mercapto-functional groups; and
 a catalyst.

BACKGROUND OF THE INVENTION

Unsaturated groups, such as acryloyl groups, can react with active hydrogen-containing compounds. Such a reaction is believed to involve an addition of an anion derived from the nucleophilic, active hydrogen-containing compound, acting as a donor, to the activated unsaturated group, which serves as an acceptor. When these active hydrogen-containing compounds are C—H compounds such as malonic ester or acetoacetate, the reaction is known as the Michael addition reaction. It is also known that SH-compounds may function as active hydrogen-containing compounds in a reaction mechanism which is similar to the Michael addition reaction. Hereinafter, such a reaction mechanism with SH-compounds is called a thio-Michael reaction.

A composition such as described in the opening paragraph, which is curable by such a thio-Michael reaction, is known from European patent application EP-A 0 160 824. Catalysts mentioned in this disclosure are quaternary ammonium compounds, tetramethyl guanidine, diaza-bicyclo-undecene, and diaza-bicyclo-nonene. Thio-Michael reactions catalysed by these strong bases are hard to control. Such reactions take place either much too fast or not at all, depending on the concentration of the used catalyst. Tertiary amines may be present but, according to this publication, are not reactive at ambient temperatures. Furthermore, the base-catalysed reaction may suffer from acid inhibition.

Carbon dioxide present in the air or an acidic substrate may severely retard or even stop cross-linking.

U.S. Pat. No. 2,759,913 discloses a copolymerisation process of unsaturated monomers with mercapto-functional compounds with a basic catalyst such as trimethyl benzyl ammonium hydroxide. As mentioned above, reactions with such a catalyst are hard to control.

British patent application GB-A 2,166,749 discloses a room temperature curable coating composition comprising an unsaturated polyester and a compound comprising at least three thiol groups and a catalyst which is a tertiary amine, such as triethyl amine. However, as can be seen from the Examples in GB-A 2,166,749, this reaction takes about 16 hours to cure at ambient temperatures. Faster reaction will only take place at high temperatures.

SUMMARY OF THE INVENTION

European patent application EP-A-0 284 374 discloses a polymerizable vinyl compound having a polythioether skeleton prepared from a compound comprising two or more olefinically unsaturated groups comprising at least one electron withdrawing functionality linked to a carbon atom of the unsaturated bond, a compound comprising at least two mercapto-functional groups, and a catalyst such as diethylamine. It is not disclosed that these reactant as such may be used in a coating or adhesive composition.

United States patent U.S. Pat. No. 5,840,823 discloses an adhesive composition comprising a compound comprising two or more olefinically unsaturated groups comprising at least one electron-withdrawing functionality linked to a carbon of the unsaturated bond, and a compound comprising a plurality of groups selected from thiol groups, primary amino groups or secondary amino groups. However, in U.S. Pat. No. 5,840,823 it is not taught nor suggested to use a compound with primary or secondary amino groups in combination with a compound comprising thiol groups.

The object of the invention is to provide a composition which overcomes the above-mentioned drawbacks.

DETAILED DESCRIPTION OF THE INVENTION

The object of the invention is achieved with a composition of the type described in the opening paragraph comprising a catalyst comprising at least one, optionally blocked, NH-group.

Surprisingly, it has been found that although the prior art teaches that strong basic catalysts are needed, thio-Michael curable compositions comprising a catalyst according to the invention show rapid curing at ambient temperatures. This has the evident advantage that short production times are possible. Energy costs can be saved since curing takes place at ambient temperatures. Furthermore, in comparison with Michael and thio-Michael reactions catalysed by strong bases, the reaction time is much less dependent on the amount of catalyst This is advantageous for ease of formulation. It has also been found that the process can be carried out with low viscous oligomers. This has the advantage that compositions can be prepared which contain few if any solvents, but are still sprayable. The reactive groups involved in the curing reaction are much less toxic than most cross-linkable reactive groups in other adhesives or coating compositions, such as isocyanates. After curing, the applied layer is resistant to hydrolysis and degradation. Also, the thermal stability of the sulphide bond is high.

In the compound comprising two or more olefinically unsaturated groups, the olefinically unsaturated groups comprise at least one electron-withdrawing functionality linked to a carbon atom of the unsaturated bond. The olefinically unsaturated bond may be a double or a triple bond. Preferably, the olefinically unsaturated groups of the compound comprising two or more olefinically unsaturated groups have a structure according to the following formula I:

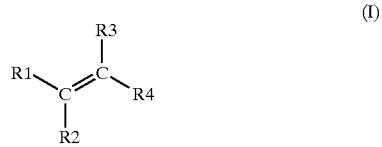

(I)

wherein at least one of R1, R2, R3, and R4 comprises an electron-withdrawing functionality linked to a carbon atom of the unsaturated bond and at least one of R1, R2, R3, and R4 is linked to a polyvalent group comprising at least two valencies.

Examples of the electron-withdrawing functionality include carbonyl, carboxyl, ester, thiocarbonyl, thiocarboxyl, thioesters, sulfoxide, sulfonyl, sulfo, phosphate, phosphite, phosphonite, phosphinite, nitro, nitrile, and amide.

In the case of R1, R2, R3, and/or R4 being monovalent, the electron-withdrawing functionality may be attached to a hydrogen atom, linear or branched alkyl, cycloalkyl, alkenyl, cyclo-alkenyl, alkynyl, cyclo-alkynyl, and aryl which may optionally be substituted with various other functionalities, such as carboxylic acid or hydroxide. If they do not comprise an electron-withdrawing functionality, R1, R2, R3, and/or R4 may be independently selected from a hydrogen atom, linear or branched alkyl, cycloalkyl, alkenyl, cyclo-alkenyl, alkynyl, cyclo-alkynyl, and aryl which may optionally be substituted with various functionalities, such as carboxylic acid or hydroxide. When at least one of R1, R2, R3, and R4 is linked to a polyvalent group and it is not an electron-withdrawing functionality, it may be a simple bond. The polyvalent group links at least two groups according to formula I. The polyvalent group may be selected from a simple bond, substituted or unsubstituted alkylene, cycloalkylene, alkenylene, cycloalkenylene, alkynylene, cycloalkynylene, arylene, or combinations thereof. The polyvalent group may optionally comprise hetero atoms such as —O—, —S—, —Si—, and —P—, and groups such as amide, urea, and ester groups.

Preferably, the group according to formula I is derived from an unsaturated carboxylic acid comprising 2 to 10, preferably 3 to 6, carbon atoms. The carboxylic acid may be mono- or polyunsaturated and may be a monocarboxylic or polycarboxylic acid. Examples of suitable monocarboxylic acids are acrylic acid, methacrylic acid, cinnamic acid, propargylic acid, and dehydrolevulinic acid. Examples of suitable polycarboxylic acids are citraconic acid, maleic acid, itaconic acid, or the anhydrides thereof, and mesaconic acid and fumaric acid. Also monoesters of mono- and polycarboxylic acids and diesters of polycarboxylic acids may be used such as acrylic acid esters, maleic acid mononitrile-monoesters, diethyl maleate, cyanoacrylic acid esters, and alkylidene malonic acid esters as disclosed in WO 98/41561. Acrylic acid or its ester, maleic acid, its ester or anhydride are preferred.

When the group according to formula I is derived from acrylic acid or its ester, a suitable example of a compound comprising two or more olefinically unsaturated groups includes trimethylol propane triacrylate.

When the group according to formula I is derived from maleic acid, ester(s) or anhydride, suitable examples of compounds comprising two or more olefinically unsaturated groups include polyesters of diethyl maleate with diols, such as 1,5-pentane diol, 1,3-propane diol and/or 2-butyl-2-ethyl propane diol, optionally reacted with polyisocyanates; the reaction product of an epoxy-functional compound, such as Cardura® E10 (an aliphatic epoxy compound available from Shell Chemical Company), and isobutyl monomaleate, further reacted with the trimer of isophorone diisocyanate, e.g., Vestanat® T 1890 E, available from Hüls; and the reaction product of maleic anhydride, dipentaerythritol, and butanol.

Alternatively, the group according to formula I may be derived from unsaturated aldehyde.

Finally, the compound comprising two or more olefinically unsaturated groups comprising at least one electron-withdrawing functionality linked to a carbon atom of the unsaturated bond may be an unsaturated ketone, such as divinyl ketone or dibenzal acetone.

The compound comprising at least two mercapto-functional groups may be prepared by direct esterification of a mercapto-functional organic acid with a polyol. Examples of mercapto-functional organic acids include 3-mercaptopropionic acid, 2-mercaptopropionic acid, thiosalicylic acid, mercaptosuccinic acid, mercaptoacetic acid, or cysteine. Examples of compounds prepared according to such a method include pentaerythritol tetrakis (3-mercaptopropionate), pentaerythritol tetrakis (2-mercaptoacetate), trimethylol propane tris (3-mercaptopropionate), trimethylol propane tris (2-mercaptopropionate), and trimethylol propane tris (2-mercaptoacetate). A further example of a compound prepared according to such a method consists of a hyperbranched polyol core based on a starter polyol, e.g. trimethylol propane, and dimethylol propionic acid. This polyol is subsequently esterified with 3-mercaptopropionic acid and isononanoic acid. These methods are described in European patent application EP-A 0 448 224 and international patent application WO 93/17060. Another example of a compound comprising at least two mercapto-functional groups is a mercaptane functional polyurethane resin. In a first step, an isocyanate functional polyurethane is prepared from diols, diisocyanates, and building blocks containing groups which facilitate the stabilization of the resin in an aqueous dispersion. Such groups are for example polyethylene oxide derivatives, sodium sulfonate groups, and other ionic stabilizing groups. In a second step, the isocyanate functional polyurethane is reacted with di-, tri-, or tetra functional thiols, such as trimethylol propane trimercapto propionate and pentaerythritol tetramercapto propionate. The equivalent ratio of thiol groups to isocyanate groups in this step is between 2–5:1. Such a resin is suitable for waterborne coating composition.

Alternatively, the compound comprising at least two mercapto-functional groups may for example have a structure according to the following formula: $T[(C_3H_6O)_nCH_2CHOHCH_2SH]_3$, with T being a triol such as trimethylolpropane or glycerol. An example of such a compound is commercially available from Henkel under the trademark Henkel Capcure® 3/800.

Other syntheses to prepare compounds comprising at least two mercapto-functional groups involve:

the reaction of an aryl or alkyl halide with NaHS to introduce a pendant mercapto group into the alkyl and aryl compounds, respectively;

the reaction of a Grignard reagent with sulphur to introduce a pendant mercapto group into the structure;

the reaction of a polymercaptan with a polyolefin according to a nucleophilic reaction, such as a Michael addition reaction, an electrophilic reaction or a radical reaction;

the reduction of disulphides; and other routes, as mentioned in Advanced Organic Chemistry by Jerry March, 4th edition, 1992, page 1298.

It is preferred that the mercapto-functional groups and the olefinically unsaturated groups are present in the composition in an equivalent ratio between 1:2 and 2:1, preferably about 1:1.

In an alternative embodiment of the present invention, the compound comprising two or more olefinically unsaturated groups comprising at least one electron-withdrawing functionality linked to a carbon atom of the unsaturated bond and the compound comprising at least two mercapto-functional groups may be one and the same compound. This embodiment results in a self-cross-linkable composition in the presence of a catalyst comprising at least one, optionally blocked, NH-group.

The composition of the present invention comprises a catalyst comprising at least one NH-group which may optionally be blocked. Catalysts comprising at least one NH-group are for example primary and secondary amines. Catalysts comprising at least one blocked NH-group are for example aldimines, ketimines, enamines, and oxazolidines. Also included are catalysts wherein a NH-group originates by daylight or UV radiation.

Examples of primary amines include isophorone diamine, butyl amine, n-octyl amine, n-nonyl amine, N,N-diethylamine-propyl-3-amine, 4-(aminomethyl)-1,8-octane diamine, aniline, methoxy aniline, carboxy ethyl aniline, phenylene diamine, and mixtures thereof. Also included are polyoxyalkylene amines, such as polyoxy ethylene/polyoxy propylene mono-, di, or triamines. These are available from Huntsman under the tradename Jeffamine®, such as Jeffamine® T-403.

A suitable secondary amine is for instance di-octyl amine.

Other suitable catalysts are ketimines, i.e. the condensation products of primary amino groups with ketones, or aldimines, i.e. the condensation products of primary amino groups with aldehydes. In these condensation reactions, groups with the following formula are formed:

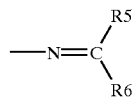

wherein R5 is an alkyl group, a cyclic group, or an aromatic group, and R6 is hydrogen in the case of an aldimine or an alkyl group, a cyclic group, or an aromatic group in the case of a ketimine. Preferably, R5 and/or R6 are alkyl groups. More preferably, R5 and/or R6 are alkyl groups comprising 1–10 carbon atoms.

Examples of aldimines include the condensation products of monofunctional amines like n-octyl- or n-nonyl amine and polyfunctional amines like isophorone diamine with acetaldehyde, propionaldehyde, isobutyraldehyde, n-octyl aldehyde, 2-ethylhexyl aldehyde, or n-nonyl aldehyde. A commercial product is for example Vestamine® A139, isophorone bisisobutyraldimine, ex Hüls. Also aromatic aldehydes and dialdehydes and heterocyclic aldehydes and dialdehydes and mixtures thereof may be used. Examples of aromatic aldehydes include 4-acetamidobenzaldehyde, anthracene-9-carboxaldehyde, 3-benzyloxybenzaldehyde, 4-benzyloxybenzaldehyde, 3-benzyloxy-4-methoxybenzaldehyde, 3,5-bis(trifluoromethyl) benzaldehyde, 3-bromo-4-methoxybenzaldehyde, 5-bromo-2-methoxybenzaldehyde, 2-bromobenzaldehyde, 3-bromobenzaldehyde, 4-bromobenzaldehyde, α-bromocinnamaldehyde, 3-bromo-4-fluorobenzaldehyde, 4-bromo-2-fluorobenzaldehyde, 5-bromo-2-fluorobenzaldehyde, 5-bromo-2-hydroxybenzaldehyde, 2-chlorobenzaldehyde, 3-chlorobenzaldehyde, 4-chlorobenzaldehyde, and other halogen substituted aromatic aldehydes, 4-butoxybenzaldehyde, 2,3-dihydroxybenzaldehyde and other isomers, 2,3-dimethoxybenzaldehyde and other isomers, 3,4-dimethoxy-6-nitrobenzaldehyde, 4-dimethylaminobenzaldehyde, 2,5-dimethyl-p-anisaldehyde, 2,4-dinitrobenzaldehyde, 4-phenoxybenzaldehyde, 3-phenoxybenzaldehyde, 4-phenylbenzaldehyde, p-tolualdehyde, o-tolualdehyde, and m-tolualdehyde, 2,4,6-trimethylbenzaldehyde and other alkyl substituted benzaldehydes. Examples of aromatic dialdehydes include 1,3-benzenedialdehyde and terephthalaldehyde. Examples of heterocyclic aldehydes include thiophene-2-carboxaldehyde, thiophene-3-carboxaldehyde, 5-acetoxymethyl-2-furaldehyde, 4-bromo-2-thiophenecarboxaldehyde, 3,5-dimethyl-1-phenylpyrazole-4-carboxaldehyde, 3-phenyl-1h-pyrazole-4-carboxaldehyde, picolinaldehyde, 4-pyridinecarboxaldehyde, 3-pyridinecarboxaldehyde, and 4-quinolinecarboxaldehyde. An example of a heterocyclic dialdehyde includes 2,5-thiophenedicarboxaldehyde.

Suitable ketimines are the condensation products of mono- and polyfunctional amines with for instance acetone, methylethyl ketone, methylisobutyl ketone, methylisoamyl ketone, ethylamyl ketone, cyclohexanone, acetophenone, hydroxyacetophenone, or acetyl biphenyl. One example is the reaction product of 3 moles of ethyl amyl ketone and 4-(aminomethyl)-1,8-octane diamine.

An example of a suitable oxazolidine is Incozol® LV, available from Industrial Copolymers Ltd., i.e. the reaction product of 1 mole of diallyl carbonate and 2 moles of an oxazolidine produced from diethanolamine and isobutyraldehyde.

An example of a suitable enamine is 1-pyrrolidino-1-cyclohexene.

Catalysts wherein an NH-group originates by UV radiation are disclosed by J. F. Cameron et al., J. Org. Chem., 1990, 55, pp. 5919–5922. Examples of catalysts wherein an NH-group originates by UV radiation include N-[[1-(3,5-dimethoxyphenyl)-1-methyl-ethoxy]carbonyl] cyclohexylamine, N,N'-bis[[1-(3,5-dimethoxyphenyl)-1-methylethoxy]carbonyl]hexane-1,6-diamine, N-[[1-(3,5-dimethoxyphenyl)-1-methylethoxy]carbonyl]piperidine, [[1-(3,5-dimethoxyphenyl)-1-methylethoxy]carbonyl] amine, [[(2,6-dinitrobenzyl)oxy]carbonyl]cyclohexyl amine, 4,4'-[bis[[2-nitrobenzyl)oxy]carbonyl]trimethylene] dipiperidine, 3,3',5,5'-tetramethoxybenzoin cyclohexyl carbamate, and mixtures thereof.

The NH-functional catalysts, optionally blocked, can be used alone, as mixtures of catalysts of the same nature, or as mixtures of catalysts of a different nature. In particular, if the composition according to the invention is used as a primer, it is preferred to use a mixture of aldimines and ketimines as a catalyst. A mixing weight ratio of 0,1–10:1, preferably 2–6:1, can be used. It has been found that this results in a better adhesion to the substrate.

Since the reaction time is only dependent on the amount of catalyst to a small extent, high concentrations of catalyst can be used without making the reaction uncontrollable. It has been found that the sensitivity of a base coat or top coat to an acidic substrate or primer, and hence the curing time, is lower when higher concentrations of catalysts according to the invention are used. This sensitivity is believed to be reduced even more if tertiary amines are added to the top coat or base coat composition, since they are believed to adhere to the used acidic primer or acidic substrate and to neutralise its acidity. The full amount of catalyst is then used to catalyse the reaction. A suitable tertiary amine is N,N-dimethyl-ethanol-amine.

Preferably, the catalyst is used in an amount of 0,01–10 eq. % nitrogen groups, based on the total of unsaturated and thiol groups. An amount of 0,1–6 eq. % is more preferred.

The composition according to the present invention may be a water-borne composition, a solvent-borne composition or a solvent-free composition. Since the composition may be composed of low viscous oligomers, it is especially suitable for use as a high-solids coating or a solvent-free coating. Preferably, the theoretical volatile organic content (VOC) of the composition is less than 450 g/l, more preferably less than 350 g/l, most preferably less than 250 g/l.

In order to further reduce the volatile organic content, reactive diluents may be used, such as diethyl maleate, methoxypropyl citraconimide, diethylbenzylidene malonate, an α,β-unsaturated aldehyde, e.g., cinnamaldehyde or citral, and monothiol functional compounds, such as dodecyl mercaptane and mercapto functional silanes, such as γ-mercapto-propyl-trimethoxysilane. The mercapto-functional groups and the olefinically unsaturated groups of the reactive diluents are also taken into account with regard to the above-mentioned equivalent ratio.

The present compositions are of particular interest in coating compositions or adhesives. Preferably, a two-pack composition is used. Preferably, the first component of the two-pack coating or adhesive comprises the compound comprising two or more olefinically unsaturated groups as well as the compound comprising at least two mercapto-functional groups, while the second component of the composition comprises a small amount of a catalyst solution. However, if so desired, the second component may comprise, next to the catalyst, a part or the total amount of either the compound comprising olefinically unsaturated groups or the compound comprising mercapto-functional groups.

The formulations may contain pigments, effect pigments, such as aluminium parts, UV absorbers, adhesion promoters, such as epoxy silane, HALS-type stabilizers, flow additives or other additives.

The composition according to the present invention can be applied by conventional methods, including spraying, brushing, roller coating or dipping. However, the composition of the present invention is particularly suitable for application by an external mixing apparatus, one wherein a liquid composition comprising:

a compound comprising two or more olefinically unsaturated groups comprising at least one electron-withdrawing functionality linked to a carbon atom of the unsaturated group, and a compound comprising at least two mercapto-functional groups, is sprayed via a spray nozzle, with a small amount of a liquid catalyst composition comprising at least one catalyst comprising at least one, optionally blocked, NH group, being injected into the spray of the sprayed composition.

Such an apparatus is described, for example, in WO 98/41316. Due to the very effective use of the catalysts, the compositions according to the present invention have very short curing times, which makes this method specifically suitable for these compositions.

The composition according to the invention can be used on various substrates, in particular wood, plastics, and metal substrates such as aluminium, steel, or galvanised steel, for industrial applications of any kind. The composition can be used for instance as an adhesive or as a coating, e.g., as a pufty, primer, filler, base coat, top coat or clear coat. The composition is particularly advantageous for use as a coating for car repair, since it is easily sprayable and can be applied at ambient temperatures. Generally in car repair, several layers need to be applied, such as a primer, a base coat, and a clear coat. Because of the short drying times, a next layer can be applied within a short time from applying a first layer.

The invention is further illustrated by the following examples.

EXAMPLES

In the following Examples the compounds listed below are available as indicated.

| Compounds | Description | Available from |
|---|---|---|
| Autobase ® | solvent-borne base coat | Akzo Nobel Car Refinishes |
| Autocryl ® 3110 | filler | Akzo Nobel Car Refinishes |
| Autocryl ® LV | solvent-borne top coat | Akzo Nobel Car Refinishes |
| Autowave ® | waterborne base coat | Akzo Nobel Car Refinishes |
| Byk ® 306 | substrate wetting additive | BYK-Chemie |
| Byk ® 333 | silicon flow additive | BYK-Chemie |
| Cardura ® E10 | aliphatic epoxy compound | Shell Chemical Company |
| Disperbyk ® 110 | dispersing agent | BYK-Chemie |
| Incozol ® LV | oxazolidine | Industrial Copolymers Ltd |
| Jeffamine ® T 403 | primary triamino-functional polyalkylene oxide | Huntsman Corporation |
| Sparkle Silver ® E 5000 AR | non-leafing aluminium paste | Silberline Ltd |

-continued

| Compounds | Description | Available from |
|---|---|---|
| Tinuvin ® 1130 | UV absorber | Ciba |
| Tinuvin ® 123 | sterically hindered amine light stabiliser | Ciba |
| Tinuvin ® 292 | sterically hindered amine light stabiliser | Ciba |
| Vestamine ® A139 | isophorone bisisobutyraldimine | Hüls |
| Vestanat ® T1890 E | trimer of isophorone diisocyanate | Hüls |
| Washprimer ® CR | primer | Akzo Nobel Car Refinishes |

In the Examples, the following abbreviations are used for the compounds as indicated.

| | |
|---|---|
| DBU | diazabicycloundecene |
| DMEA | N,N-dimethyl-ethanol-amine |
| IPDA | isophorone diamine |
| PTMP | pentaerythritol tetrakis(3-mercaptopropionate) |
| TAN-EAK | the reaction product of 3 moles of ethyl amyl ketone and 4-(aminomethyl)-1,8-octane diamine |
| TMP(2MA)3 | trimethylol propane tris (2-mercaptoacetate) |
| TMP(3MPA)3 | trimethylol propane tris (3-mercaptopropionate) |
| TMPTA | trimethylol propane triacylate |

In the Examples, mercapto-functional groups and olefinically unsaturated groups are present in the coating compositions in an equivalent ratio of 1:1.

Curing times were measured using a BK drying recorder. The curing time is the time between the application of the sample and the phase when the pen of the BK drying recorder does not damage the coating down to the substrate anymore (phase III).

A coating is free to handle when the mark from firm pushing with the thumb disappears after 1 or 2 minutes.

Viscosity is measured with a Cone and Plate viscometer, type CAP 2000.

Adhesion was tested using the so called pull-off test, in which a cross-cut at 45° is made with an Olfa® cutter, after which a standard type adhesion tape is stuck on the paint and gently pulled off again. The values 1–10 represent a scale for evaluation of the adhesion ranging from very poor adhesion (1) to excellent adhesion (10).

Gitterschnitt adhesion was measured in accordance with ISO 2409. The adhesion is determined visually on a scale from 0 (=no detachment) to 5 (=total detachment). The condense test used together with the Gitterschnitt adhesion test had the following conditions: 10 days at 100% relative humidity at 42° C.

Stone chip resistance was measured according to the Ford standard test Ford 57–4. The values 0–7 represent a scale for evaluation of the stone chip resistance ranging from very poor (7) to excellent (0).

The accelerated weathering test was carried out in accordance with international standard ISO 2810.

The presence of blisters in cured layers was tested in accordance with ASTM-D714. The results are scaled in values ranging from 1 (big blisters) to 10 (no blisters), with a further code for the blister density, F standing for "few," M for "medium," and D for "dense."

Example 1

Preparation of a Maleate-functional Polyester

A 2-liter 4-neck flask was fitted with a variable speed stirrer, thermocouples in combination with a controller, a distillation column, a condenser, a nitrogen sparge, and a heating mantle. The flask was charged with 1240 grams of diethyl maleate, 235 grams of 1,5-pentane diol, 360 grams of 2-butyl-2-ethyl propane diol, 3,7 grams of dibutyl tin oxide catalyst, and 5 wt. % of xylene. The nitrogen sparge and the stirrer were turned on. The heating mantle was set to heat the reactor charge to 150° C. with a limit of 79° C. at the top of the column. Ethanol was collected and when the distillation rate diminished, another amount of 5 wt. % xylene was added in about 60 minutes, followed by reaction under diminished pressure. At the end the amount of xylene, together with the ethanol residue was distilled off. The reaction conversion, calculated from the amount of ethanol, was more than 98%. The solids content of the end product was 99,6%. The viscosity at 23° C. was 1 Pa.s. The maleate number was 278 mg KOH/g solids.

Example 2

Preparation of a Maleate-functional Oligo-urethane

A 2-liter 4-neck flask was fitted with a variable speed stirrer, thermocouples in combination with a controller, a reflux condenser, a nitrogen sparge, and a heating mantle. The flask was charged with 375 grams of Cardura® E10. The nitrogen sparge and the stirrer were turned on and the batch charge was heated to a temperature of 100° C. Next, 260 grams of isobutyl monomaleate and 0,64 gram of chromium(III) 2-ethyl hexanoate were added while the batch temperature was kept at 120° C. (exothermic reaction). The reaction was carried out at 120° C. until the COOH-conversion was at least 98%, followed by cooling down to 80° C. Then, 0,5 gram of dibutyl tin dilaurate catalyst was added, followed by the addition of 525 grams of Vestanat® T1890 E, while the batch temperature was kept below 90° C. The reaction was completed at 90° C. when an NCO conversion of at least 98% was reached. The product was cooled down, diluted with n-butyl acetate to a solids content of 70 wt. %. The measured solids content of the resulting product was 72,4%. The viscosity at 23° C. was 1,9 Pa.s. The maleate number was 84 mg KOH/g solids.

Example 3

Preparation of a Mercapto-functional Polyester

A 2-liter 5-neck flask was fitted with a variable speed stirrer, thermocouples in combination with a controller, a Vigreux column, a condenser, a nitrogen sparge, and a heating mantle. The flask was charged with 48 grams of trimethylol propane, 763 grams of dimethylol propionic acid, and, as a catalyst, 20,5 grams of para-toluene sulfonic acid. The nitrogen sparge and the heating mantle were turned on. The stirrer was turned on when the batch charge had been melted. The first step of the esterification at 140° C. was carried out until an acid value of less than 10 mg KOH/g solids was reached. Next, 108 grams of isononanoic acid were added, followed by rinsing with about 5 wt. % of xylene. During the same time the batch solution was cooled down to 120° C. Next, 582 grams of 3-mercaptopropionic acid were added in about 60 minutes, followed by rinsing with 5 wt. % of xylene. During the addition of the 3-mercaptopropionic acid the batch temperature was increased to 140° C. The second step of the esterification was carried out at 140° C., with an additional 10 grams of para-toluene sulfonic acid, with xylene refluxing under diminished pressure, until an acid value of less than 15 mg KOH/g solids was reached. Then, 6 grams of lithium carbonate were added, followed by cooling down and diluting with n-butyl acetate with a dilution to solids content of 81 wt. %. The preparation was completed by filtration at about 70° C. using a pressure filter with filter aid, which yielded a clear resin. The total OH- and SH-value of the resulting product was 254 mg KOH/g solids. The solids content was 81,8%. The viscosity at 23° C. was 1,3 Pa.s.

Examples 4–11

Comparative Examples A and B

In the following Examples 4–11 and Comparative Examples A and B, a coating composition was prepared comprising 40 g of PTMP and 36 g of TMPTA. Different catalysts were used, as is shown in the following Table I. In Examples 4–11 a catalyst according to the invention was used. In Comparative Examples A and B prior art catalysts were used. In all of the Examples 4–11 and Comparative Examples A and B, 0,5 eq. % of catalyst was used. The compositions were prepared and subsequently applied on a glass plate using a 200-micron draw bar. The samples were cured at a temperature of 21° C.

TABLE I

| Ex | Catalyst | Curing Time |
|---|---|---|
| 4 | IPDA | <1 minute |
| 5 | 1-N,N-diethylaminopropyl-3-amine | 1 minute |
| 6 | Dioctyl amine | 2 minutes |
| 7 | IPDA bis nonyl aldimine | 12 minutes |
| 8 | TAN-EAK | 5 minutes |
| 9 | 1-Pyrrolidino 1-cyclohexene | 8 minutes |
| 10 | Vestamine ® A139 | 12 minutes |
| 11 | Incozol ® LV | 105 minutes |
| A | Triethylamine | >24 hours |
| B | Sodium ethanolate | >24 hours |

In Examples 4–11 and Comparative Examples A and B, the theoretical VOC 165 g/l.

Comparative Examples A and B illustrate that tertiary amine and sodium ethanolate catalysts are not highly effective at room temperature in comparison with the catalysts according to the invention in equal concentration. Examples 4–11 show the relative effectiveness of different catalysts according to the invention. Curing times are much shorter than the curing times in Comparative Examples A and B.

Examples 12–14

Example 10 was repeated, except that different amounts of catalyst, i.e. Vestamine® A139, was used. The equimolar amount of catalyst in Example 10 corresponds to 2 wt. %. The corresponding test results, as shown in Table II, indicate the sensitivity of the system to the amount of catalyst used.

TABLE II

| Example | Catalyst | Amount | Curing Time |
|---|---|---|---|
| 12 | Vestamine ® A139 | 0,5 wt. % | 22 minutes |
| 13 | Vestamine ® A139 | 1 wt. % | 15 minutes |
| 10 | Vestamine ® A139 | 2 wt. % | 12 minutes |
| 14 | Vestamine ® A139 | 3 wt. % | 10 minutes |

In these Examples, the theoretical VOC was 165 g/l.

Comparative Examples C and D

Comparative Example A was repeated, except that another catalyst, i.e. DBU, was used in two different amounts. The test results as shown in Table III show that the use of DBU as a catalyst either results in an extremely fast reaction with a relatively small catalyst concentration, or does not result in cross-linking at all when the concentration is lowered somewhat. The same occurs with other strong basic catalysts.

TABLE III

| Comp. Example | Catalyst | Amount | Curing Time |
|---|---|---|---|
| C | DBU | 0,2 wt. % | <<1 minute |
| D | DBU | 0,1 wt. % | >24 hours |

In these Comparative Examples, the theoretical VOC was 165 g/l.

Example 15

A coating composition comprised 40 g PTMP and 64,8 g of the maleate-functional polyester of Example 1. The used catalyst was 2 wt. % Vestamine® A139 (2,3 eq. %). The theoretical VOC was 400 g/l. Application was carried out according to Example 4. The curing time was 22 minutes at 21° C.

Example 16 and Comparative Example E

In Example 16 and corresponding Comparative Example E, 31,2 g of PTMP were used in combination with 50 g of the maleate-functional polyester as prepared in Example 1. In Example 16, 1,5 wt. % of Vestamine® A139 was used as a catalyst (1,7 eq. %). In Comparative Example E, DMEA was used as the catalyst in an amount equimolar to the amount of catalyst in Example 16. The theoretical VOC was 250 g/l for both Example 16 and Comparative Example E. The composition was applied on a substrate in the same way as in Example 4. The curing time for Example 16 was 20 minutes, while the curing time for Comparative Example E was longer than 24 hours at 21° C.

Examples 17, 18, 19, and Comparative Example F

The following primer/filler formulation was prepared:

| | |
|---|---|
| mercapto-functional polyester of Example 3 | 15,21 grams |
| Disperbyk ® 110 | 0,40 gram |
| butyl acetate | 6,26 grams |
| calcium carbonate | 14,20 grams |
| magnesium silicate | 5,70 grams |
| titanium dioxide | 14,00 grams |
| zinc orthophosphate | 6,30 grams |
| low colour furnace black | 0,04 gram |
| maleate-functional polyester of Example 1 | 13,80 grams |

In order to give the composition the desired viscosity suitable for spraying, another 10,00 grams of butyl acetate were added.

This primer/filler formulation was applied by spraying with an external mixing apparatus using different catalysts on a steel substrate, the thickness of the coating layer being 80μ after curing at 21° C. In Example 17, 2,5 eq. % TAN-EAK was used. The filler was sandable after 5 minutes. In Example 18, 2,5 eq. % IPDA was used. The filler was sandable after 30 minutes.

In Example 17 as well as in Example 18 the theoretical VOC was 290 g/l.

The composition as prepared in Example 18 was applied by spraying with an external mixing apparatus on a steel substrate. In Comparative Example F, Autocryl® 3110 filler was applied on a steel substrate. Subsequently, all primed substrates were treated with a top coat, Autocryl® LV. Curing took place at a temperature of 23° C. for several days. The samples were then immersed in water for several days, after which the cross-cut adhesion of the primer to the steel substrate was evaluated. The results are given in Table IV.

To the composition prepared in Example 18 was added an adhesion promoter, namely 4% by weight of solid binder of epoxy silane (Example 19). The same tests were carried out as mentioned above. The results are also given in Table IV.

TABLE IV

| | primer/steel adhesion | | | | | |
|---|---|---|---|---|---|---|
| Water immersion (days): | 0 | 1 | 7 | 14 | Recovery | Blisters |
| C. Ex. F | 8 | 8 | 8 | 8 | 9 | 9F |
| Ex. 18 | 9 | 1 | — | — | 9 | 9F |
| Ex. 19 | 9 | 10 | 9 | 9 | 9 | 9F |

For the following tests, samples were used of the compositions of Example 18 and Comparative Example F. These primer samples were applied on substrates that had been pretreated with Washprimer® CR. Subsequently, a top coat, Autocryl® LV, was applied over the primers. Curing took place at 21° C. The results are given in the following table V.

TABLE V

| | Stone chip resistance | | Gitterschnitt adhesion | | Accelerated weathering |
|---|---|---|---|---|---|
| Sample | Before soak | After soak | Before condense test | After condense test | Adhesion loss in mm |
| Ex. 18 | 3 | 6 | 0–1 | 1 | 1,5 |
| C. Ex. F | 3 | 6 | 0–1 | 1 | 1 |

Example 20

In this Example, a base coat was prepared according to the present invention.

| | |
|---|---|
| PTMP | 60,00 grams |
| maleate-functional polyester of Example 1 | 97,41 grams |
| Sparkle Silver ® E 5000 AR | 48,43 grams |
| butyl acetate | 69,58 grams |

The theoretical VOC was 165 g/l. This base coat formulation was spray-applied on a steel substrate precoated with Autocryl® 3110 filler. The base coat was applied with the external mixing apparatus described supra using 2,5 eq. % TAN-EAK. The resulting film was over-sprayable after 7 minutes of curing at 21° C.

Example 21

| | |
|---|---|
| PTMP | 120,00 grams |
| TMPTA | 96,90 grams |
| butylacetate | 36,00 grams |
| Byk ® 306 | 0,85 gram |
| Tinuvin ® 292 | 1,08 grams |
| Tinuvin ® 1130 | 2,17 grams |

The theoretical VOC was 435 g/l. This formulation was sprayed with an external mixing apparatus with 5 eq. % catalyst solution of TAN-EAK. The layer thickness was 50μ after curing. It was free to handle after 10 minutes curing at room temperature when spray-applied on various commercial base coats, such as Autobase® and Autowave®.

Example 22

Another clear coat was prepared with the following formulation:

| | |
|---|---|
| PTMP | 13,24 grams |
| maleate-functional oligo-urethane of Example 2 | 100,00 grams |
| butyl acetate | 44,94 grams |
| Tinuvin ® 123 | 0,48 gram |
| Tinuvin ® 1130 | 0,48 gram |
| Byk ® 333 | 0,27 gram |

This formulation was cross-linked with 5 eq. % catalyst solution of Vestamine® A139 and applied, cured, and tested as in Example 21. This clear coat formulation was free to handle after 20 minutes curing at room temperature.

Example 23

A putty was formulated comprising a maleate-functional paste, a mercapto-functional paste, and a catalyst.

The maleate-functional paste comprised:

| | |
|---|---|
| titanium dioxide | 5,7 grams |
| barium sulphate | 12,1 grams |
| magnesium silicate | 82,2 grams |
| maleate-functional polyester of Example 1 | 100,0 grams |

The mercapto-functional paste comprised:

| | |
|---|---|
| titanium dioxide | 2,8 grams |
| barium sulphate | 6,1 grams |
| magnesium silicate | 41,1 grams |
| PTMP | 23,5 grams |

The used catalyst was 1,8 grams of TAN-EAK (2,75 eq. %). When mixing the above two pastes and the catalyst, a putty with a workability time of 3,5 minutes was obtained which was solid after 4,5 minutes and sandable after 10 minutes, after application on a steel substrate and curing at 21° C.

Example 24

The same composition was made as in Example 23, except that the catalyst was replaced by Vestamine® A139 (2,75 eq. %). A putty with a workability time of 5,5 minutes was obtained which was solid after 41 minutes and sandable after more than one hour, after application on a steel substrate and curing at 21° C.

Examples 25 and 26

In Examples 25 and 26 two water based clear coats according to the invention were made.

An acryloyl-functional polyurethane emulsion (43% s.c. in water, 454 C═C equivalent by weight on solid) was mixed with TMP(3MPA)3 (60% s.c. in methoxy propyl acetate). In Example 25, this composition was cured by IPDA (5 eq. %), while in Example 26, the composition was cured by Jeffamine® T 403 (2,7 eq. %).

The clear coats were applied on a glass substrate using a 100-micron draw bar and cured at 21° C.

TABLE VI

| | Example 25 | Example 26 |
|---|---|---|
| acryloyl-functional polyurethane emulsion | 31,8 grams | 31,8 grams |
| TMP(3MPA)3 | 6,7 grams | 6,7 grams |
| IPDA | 0,28 gram | — |
| Jeffamine ® T 403 | — | 0,24 gram |
| Curing time | 24 minutes | 32 minutes |

Examples 27–35

In the following Examples 27–35, coating compositions were prepared comprising the maleate-functional polyester of Example 1 and different mercapto functional compounds in an equivalent ratio of mercapto-functional groups and olefinically unsaturated groups of 1:1. Different catalysts were used in an amount of 0,75 eq. %. The compositions were applied on a glass plate using a 200-micron draw bar. The samples were cured at a temperature of 21° C. Table VII lists the curing times in minutes.

TABLE VII

| Ex | | |
|---|---|---|
| | | Incozol LV |
| 27 | PTMP | 90 |
| 28 | TMP(3MPA)3 | 94,8 |
| 29 | TMP(2MA)3 | 21,3 |
| | | Vestamine A139 |
| 30 | PTMP | 20,4 |
| 31 | TMP(3MPA)3 | 33,8 |
| 32 | TMP(2MA)3 | 29,7 |
| | | TAN/EAK |
| 33 | PTMP | 5,2 |
| 34 | TMP(3MPA)3 | 5,6 |
| 35 | TMP(2MA)3 | <1 |

What is claimed is:

1. A coating or adhesive composition comprising a compound comprising two or more olefinically unsaturated groups comprising at least one electron-withdrawing functionality linked to a carbon atom of the unsaturated bond;

a compound comprising at least two mercapto-functional groups; and a catalyst comprising at least one, optionally blocked, NH-group.

2. The composition according to claim 1, wherein the catalyst is primary or secondary amines, aldimines, ketimines, enamines, oxazolidines, or mixtures thereof.

3. The composition according to claim 1 wherein the catalyst is used in an amount of 0,01–10 eq. % nitrogen groups, based on the total of unsaturated and thiol groups.

4. The composition according to claim 1, wherein the olefinically unsaturated groups of the compound comprising two or more olefinically unsaturated groups have a structure according to the following formula I:

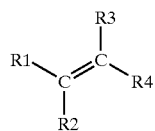

(I)

wherein at least one of R1, R2, R3, and R4 comprises an electron-withdrawing functionality linked to a carbon atom of the unsaturated bond and at least one of R1, R2, R3, and R4 is linked to a polyvalent group comprising at least two valencies.

5. The composition according to claim 4, wherein the electron-withdrawing functionality is carbonyl, carboxyl, ester, thiocarbonyl, thiocarboxyl, thioesters, sulfoxide, sulfonyl, sulfo, phosphate, phosphite, phosphonite, phosphinite, nitro, nitrile, or amide.

6. The composition according to claim 5, wherein at least one of the groups according to formula I is derived from an unsaturated carboxylic acid comprising 2 to 10 carbon atoms.

7. The composition according to claim 1, wherein the mercapto-functional groups and the olefinically unsaturated groups are present in an equivalent ratio between 1:2 and 2:1.

8. A method for the applicabon of a composition according to claim 1, wherein a liquid composition comprising
a compound comprising two or more olefinically unsaturated groups comprising at least one electron-withdrawing functionality linked to a carbon atom of the unsaturated bond; and
a compound comprising at least two mercapto-functional groups; is sprayed via a spray nozzle and that a small amount of a liquid catalyst composition comprising at least one catalyst comprising at least one, optionally blocked, NH-group is injected into the spray of the sprayed composition.

* * * * *

UNITED STATES PATENT AND TRADEMARK OFFICE
CERTIFICATE OF CORRECTION

PATENT NO. : 6,639,046 B1  Page 1 of 1
DATED : October 28, 2003
INVENTOR(S) : Joseph Theodorus Maria Van Dijk It is certified that error appears in the above-identified patent and that said Letters Patent is hereby corrected as shown below:

<u>Column 15,</u>
Line 5, add -- I -- after the formula
Line 14, change "valencles" to -- valencies --.

Signed and Sealed this

Thirteenth Day of April, 2004

JON W. DUDAS
*Acting Director of the United States Patent and Trademark Office*